United States Patent
McHugh et al.

(10) Patent No.: US 9,223,902 B1
(45) Date of Patent: Dec. 29, 2015

(54) ARCHITECTURES FOR CONTENT IDENTIFICATION

(75) Inventors: Jason G. McHugh, Seattle, WA (US); Beryl Tomay, Newcastle, WA (US); Daniel Bibireata, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 514 days.

(21) Appl. No.: 13/306,720

(22) Filed: Nov. 29, 2011

(51) Int. Cl.
*G06F 17/30* (2006.01)

(52) U.S. Cl.
CPC .... *G06F 17/30967* (2013.01); *G06F 17/30244* (2013.01); *G06F 17/30247* (2013.01)

(58) Field of Classification Search
CPC ............... G06F 17/30244; G06F 17/30247; G06F 17/30967
USPC ............. 707/707, 913, 705, 802, 919, 601; 348/239, 207.1, 333.03; 382/165, 117; 705/14.4, 319
See application file for complete search history.

(56) References Cited

U.S. PATENT DOCUMENTS

| | | | |
|---|---|---|---|
| 6,532,298 B1* | 3/2003 | Cambier et al. ............... 382/117 |
| 7,016,532 B2* | 3/2006 | Boncyk et al. ................ 382/165 |
| 7,477,780 B2* | 1/2009 | Boncyk et al. ................ 382/165 |
| 7,899,243 B2* | 3/2011 | Boncyk et al. ................ 382/165 |
| 8,406,531 B2* | 3/2013 | Ramanujapuram G06F 17/30244 382/201 |
| 8,560,583 B2* | 10/2013 | Mallinson ..................... 707/802 |
| 8,643,703 B1 | 2/2014 | Karakotsios et al. |
| 8,687,104 B2* | 4/2014 | Penov et al. ............. 348/333.03 |
| 9,107,565 B2* | 8/2015 | Jain .......................... A61B 5/00 |

| | | | |
|---|---|---|---|
| 2005/0227674 A1* | 10/2005 | Kopra et al. ............... 455/414.1 |
| 2006/0106867 A1 | 5/2006 | Burges et al. |
| 2008/0028074 A1 | 1/2008 | Ludvig |
| 2008/0030599 A1* | 2/2008 | Stavely et al. ................ 348/239 |
| 2008/0215429 A1* | 9/2008 | Ramer ............. G06F 17/30967 705/14.54 |
| 2008/0226119 A1* | 9/2008 | Candelore et al. ............ 382/100 |
| 2009/0058845 A1* | 3/2009 | Fukuda et al. ................ 345/214 |
| 2009/0063472 A1 | 3/2009 | Pell et al. |
| 2009/0172551 A1 | 7/2009 | Kane et al. |
| 2009/0285492 A1* | 11/2009 | Ramanujapuram G06F 17/30244 382/209 |
| 2010/0023530 A1* | 1/2010 | Hwang et al. ................... 707/10 |
| 2011/0043642 A1* | 2/2011 | Yu et al. .................... 348/207.1 |
| 2011/0243388 A1* | 10/2011 | Sakaguchi et al. ............ 382/103 |
| 2011/0246495 A1* | 10/2011 | Mallinson ..................... 707/758 |

(Continued)

OTHER PUBLICATIONS

"Non-Final Office Action dated Mar. 27, 2014," U.S. Appl. No. 13/306,743, 46 pages.

(Continued)

*Primary Examiner* — Jean M Corrielus
(74) *Attorney, Agent, or Firm* — Novak Druce Connolly Bove + Quigg LLP

(57) ABSTRACT

A user can capture various types of information concurrently using multiple sensors of an electronic device. This "scene" data can be provided to a service for processing, which is able to identify various types of potential matches and aggregate information to be returned to the client device. In at least some embodiments, matching information can be sent with the results such that the electronic device can match an element in the scene the next time that element is encountered, without having to contact the service again. In some embodiments, an attempt can be made to predict elements that the user might attempt to identify, and one or more corpora of data can be sent to the electronic device such that the client device can perform any matching on the device for elements in those corpora.

31 Claims, 7 Drawing Sheets

(56) References Cited

U.S. PATENT DOCUMENTS

| | | | |
|---|---|---|---|
| 2011/0247042 A1* | 10/2011 | Mallinson | 725/86 |
| 2011/0258057 A1* | 10/2011 | Boncyk et al. | 705/14.73 |
| 2012/0029670 A1 | 2/2012 | Mont-Reynaud et al. | |
| 2012/0047156 A1 | 2/2012 | Jarvinen et al. | |
| 2012/0116559 A1 | 5/2012 | Davis et al. | |

OTHER PUBLICATIONS

"Notice of Allowance dated Oct. 2, 2013," U.S. Appl. No. 13/076,322, 11 pages.

* cited by examiner

ARCHITECTURES FOR CONTENT IDENTIFICATION

BACKGROUND

Users are increasingly utilizing electronic devices to obtain various types of information. For example, a user wanting to learn the name of a song playing in the background can cause a sample of that song to be recorded by an electronic device and uploaded to a song identification service for analysis. Similarly, a user wanting to determine the availability of a book can capture an image of the book and upload that image to a book identification service for analysis. Such approaches have potential downsides, however, as they require an active connection to an appropriate service in order to transfer the information for analysis, as well as to receive the result of the analysis. If no data connection is available, the user might be able to wait until a later time when a connection is available, but cannot obtain results when the user most likely wants those results. Even when a connection is available, the amount of time necessary to upload an image or audio file and obtain the results can be undesirable for many users, particularly when using relatively slow connections such as cellular data connections. Further still, a user is only able to identify one type of information at a time, such that if the user wants to identify multiple types of information the user must provide multiple uploads through multiple different applications.

BRIEF DESCRIPTION OF THE DRAWINGS

Various embodiments in accordance with the present disclosure will be described with reference to the drawings, in which.

DETAILED DESCRIPTION

Figure 1:
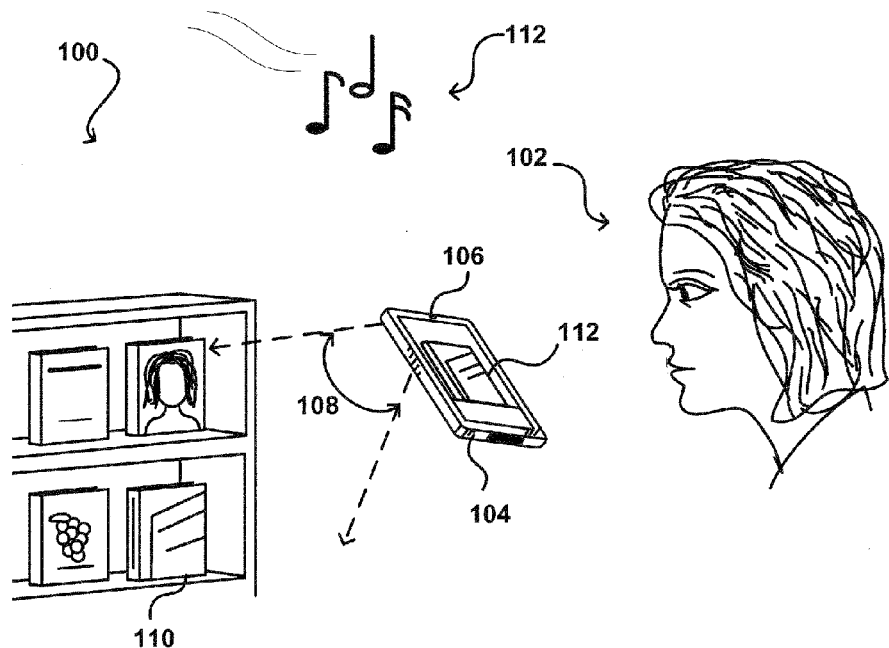
FIG. 1 illustrates an example environment in which aspects of the various embodiments can be that can be utilized.

Systems and methods in accordance with various embodiments of the present disclosure overcome one or more of the above-referenced and other deficiencies in conventional approaches to identifying various types of elements or content using an electronic device. In particular, various embodiments enable a user to provide scene data for analysis in order to attempt to identify one or more types of elements contained within the scene data. As used herein, "scene" data refers to a collection of one or more types of data that reflects information about at least one element or object of interest, as well as a context or current environment in which a computing device capturing that information is located. For example, scene data might include image information captured by one or more cameras, audio information captured by one or more microphones, position information from a global positioning system (GPS), and biometric information captured by a biometric sensor. The data can be captured concurrently at a single point in time, or captured over a period of time. In some embodiments, the data is sent as it is captured for a near real-time analysis, while in other embodiments data can be sent in batches or other periodic groupings. Approaches in accordance with various embodiments provide one or more algorithms to identify various types of elements or content included in the scene data, such as by identifying objects in the scene using image data, identifying a title of a song playing as determined by the captured audio information, determining an identity of one or more users around the device, etc. In addition to the identity information, additional information can be provided as well, such as description, personal profile information, publications, social networking information, contact information, pricing, availability, consumer reviews, and other such information.

In at least some embodiments, a user can utilize a computing device to capture information about one or more elements in the "real" world, as may be captured using one or more sensors of the device, and determine corresponding information in the digital world, such as product identifiers, audio files, video, person identifiers, place names, and other such elements. In response to identifying one or more of these elements, the client device can receive or obtain a digital entity providing some mechanism of obtaining the information in the digital world corresponding to a real world element. A "digital entity," as used herein, includes a reference to something in the digital world. For example, a digital entity can be a Web page, an entry in a database, or anything that is available over a networked group of machines. In addition to the reference, the digital entity also can contain de-normalized data that has been copied or otherwise obtained from a source of the digital entity. Further, in at least some embodiments the user can be provided with information for elements related to the captured elements of interest, such as different formats of a song, different versions of a book, and the like.

In at least some embodiments, client devices can communicate with at least one environmental information service in order to attempt to identify elements within the environment of a given device. The devices can stream or otherwise transfer scene information to the information service, which can direct at least portions of the scene information to one or more appropriate identification services. Each identification service can include one or more algorithms for matching a type of data with various digital entities, such as by detecting features in an image or unique frequencies in an audio stream or audio file and then comparing this information to a data store of matching information. The information service can aggregate the information from the various information services, and can provide information from the various services as a set of matches to be displayed to a user in response to an identify request for a particular scene. The matches can include matches of various types, such as songs playing, products identified, people near the device, and other such information. The environmental information service can also obtain and aggregate additional information for each digital entity, such as descriptions, contact information, availability, location data, pricing information, and the like, and send this information to the client device.

In at least some embodiments, the environmental information service can also send the matching information for the digital entities to the client device. For example, if the user provides scene data that includes an image of a book, the environmental information service can send a digital entity and additional information for the book in order to satisfy the user's request. In addition, the service can send matching information useful by a matching algorithm to identify that book upon a subsequent capture. By providing this information to the device, the device can perform a fast, offline analysis and matching of that book without having to contact the environmental information service again to re-identify the book. Such an approach can enable matching when there is no connection available or resource conservation is desired, for example, and can increase the average matching speed which can enhance the user experience.

Services in accordance with various embodiments can attempt to predict elements that device sensors are likely to capture as part of a scene and send digital entities and matching information to the device for efficient, real-time matching. This optimistic caching approach generates one or more corpora of digital entities that the user might be likely to want to identify, and can forward those corpora to the device for storage for at least a period of time. The corpora can include elements related to a particular topic or sharing a common aspect, such as songs of a particular style or currently popular clothing items. Based at least in part upon user actions, interests, behaviors, or other such information, one or more of these corpora can be selected to be provided to the user in order to attempt to enable offline matching and increase the efficiency of the matching process.

Further, corpora can be generated and/or sent based on current contextual information. For example, a user walking into a bookstore might have a corpus pushed to that user's device that includes matching information for the current best selling books. Similarly, a user going to the mall with that user's kids might receive a corpus for toys available at a toy store in the mall, where the user might not get that corpus if the user went alone. The corpora can be set to expire in at least some embodiments after the user leaves the relevant location, or at another appropriate time.

As mentioned, the corpora can enable a device to perform faster matching and/or offline matching for elements included in those corpora. Such an approach also can be used with remote services, however, as a client device can match elements in a locally-stored corpus relatively quickly in order to provide some matching results to the user, while additional matches might be received slightly later from the remote services that are able to match against very large data stores of information. Such a hybrid approach can help to improve the user experience while still providing a full set of results.

Information captured from the scene data can be combined or otherwise used with information from an electronic marketplace, electronic yellow pages, location information service, or other digital environment. For example, a user identifying a type of element from scene data might have that information used to recommend products through the electronic marketplace. Similarly, a user viewing articles about space on a Web site might have a corpus pushed to an associated client device, where that corpus includes digital entities for space-related elements.

Various other functions and advantages are described and suggested below as may be provided in accordance with the various embodiments.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players.

In this example, a camera on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. At the same time, a microphone (not shown) of the device might capture audio data including a portion of a song 112 playing in the bookstore at the time the image of the book was captured. The portion of the image to be analyzed can be indicated manually, such as by a user pointing to the book on the screen or drawing a bounding box around the book. In other embodiments, one or more image analysis algorithms can attempt to locate one or more elements in a scene to be analyzed. In some embodiments, a user can manually cause image information to be analyzed, while in other embodiments the image information can be analyzed automatically, either on the device or by streaming scene data to a remote system or service as discussed later herein.

Figure 2:
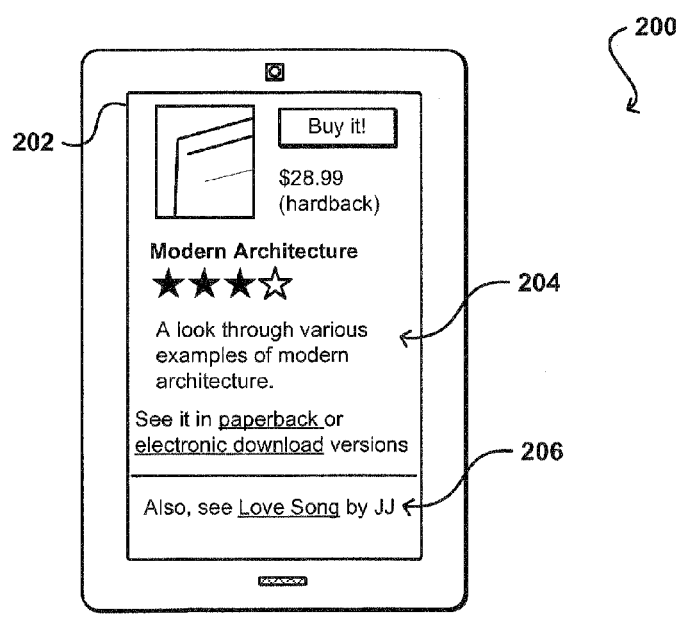
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the scene data using one or more matching or identifying algorithms, or other such approaches. These can include, for example, image recognition algorithms, feature recognition algorithms, facial recognition algorithms, audio pattern recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. In addition, a second result 206 might is shown that enables the user to obtain information about he song that was playing in the bookstore at the time. Further, the type of information displayed (or otherwise conveyed) can depend at least in part upon the type of content located or matched. For example, a located song might include artist and title information, as well as audio formats in which the song is available. For facial recognition, the information might include name, title, and contact information. Various other types of information can be displayed as well within the scope of the various embodiments.

Figure 3:
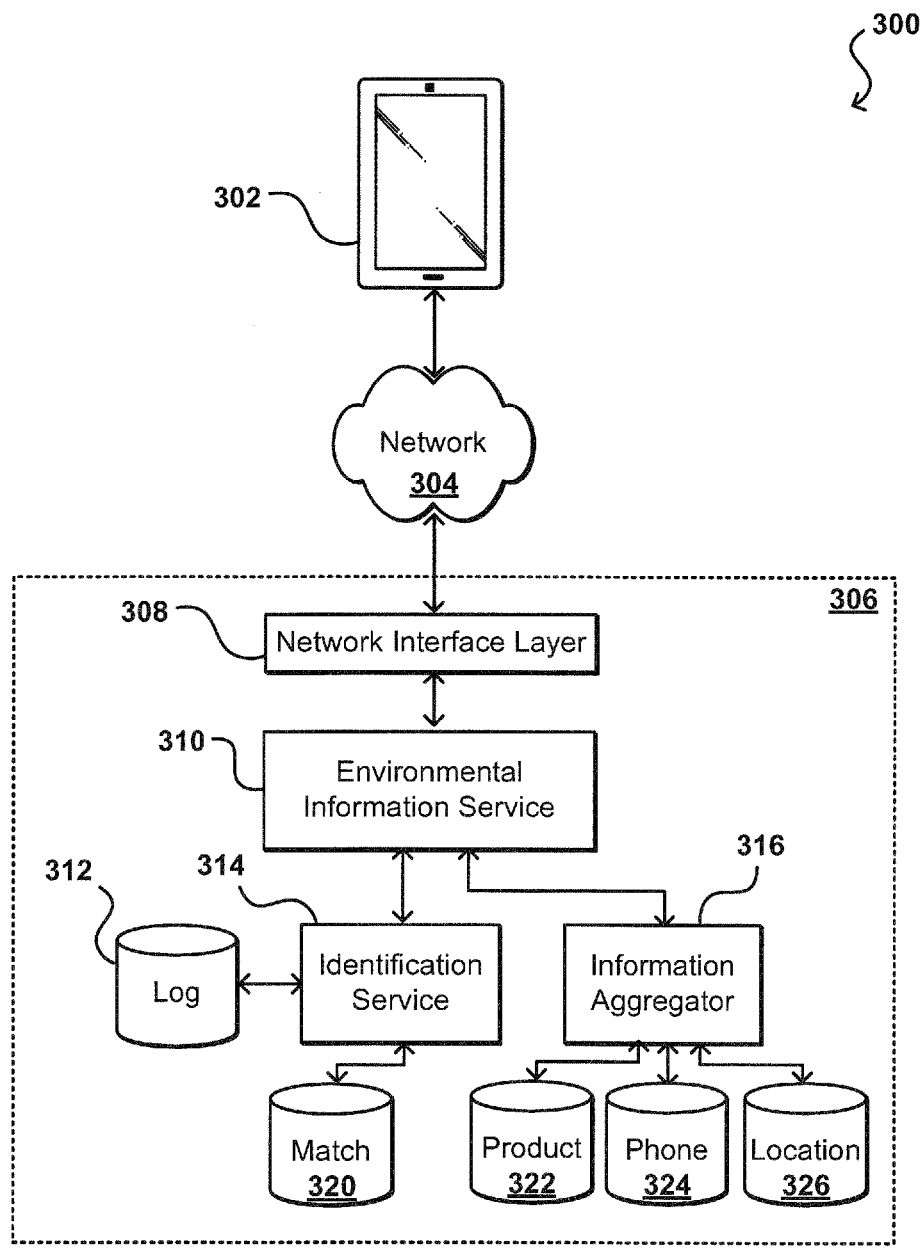
FIG. 3 illustrates example system for identifying elements and providing information that can be utilized in accordance with various embodiments.

As discussed, information such as that illustrated in FIG. 2 can be located by streaming (or otherwise transferring) an image, audio clip, and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture audio and/or video information around the device, and can send at least a portion of that audio and/or video information across at least one appropriate network 304 to attempt to obtain information for one or more objects, persons, or occurrences within a detectable vicinity of the device. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of scene data is obtained in order to obtain a set of results. In other embodiments, scene data can be streamed or otherwise transmitted as quickly as possible in order to provide near real-time results to a user of the computing device.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as an environmental information service 310 as illustrated in FIG. 3. An environmental information service in this example includes components operable to receive electronic data about an environment, such as the region around a computing device, analyze the data using business logic, and return information relating to people, products, places, or things around the computing device at or around the time of the capture or transmission of that electronic information. For example, an environmental information service can receive information including one or more images of objects near a device, audio information for a song playing near the device, and biometric information for a person holding the device. The environmental information service is capable of recognizing the types of information (e.g., different types of sensor data) and causing each type to be analyzed for purposes of identifying one or more persons, objects, or occurrences in each type of information. In some embodiments, the different types of information might be sent as separate requests, which can be aggregated by the environmental information service 310 for purposes of analysis. The environmental information can also be programmed to aggregate results for each type of information and transmit those results back to a user in response to the initial request.

The environmental information service 310 in this example can cause information to be sent to at least one identification service 314 or system that is operable to attempt to match information for at least one type of data, type of sensor, etc. For example, one identification service might attempt to recognize objects in captured image data, while another identification service might attempt to recognize songs in captured audio data. Various other services, and combinations of services, can be utilized as well within the scope of different embodiments. In at least some embodiments, an identification service 314 will process the received data, such as to extract points of interest or unique features in a captured image, for example, then compare the processed data against data stored in a matching data store 320 or other such location. The data in the matching location data store might be indexed and/or processed to facilitate with matching, as known for such purposes. For example, the data store might include information for unique features in an image instead of a copy of the image itself, which can increase the speed and lower the processing requirements of the matching.

The environmental information service 310 can receive information from each contacted identification service 314 as to whether one or more matches could be found for at least one type of data, and can receive any appropriate information for a located potential match. The information from each identification service can be analyzed and/or processed by one or more applications of the environmental information service, such as to determine data useful in obtaining information for each of the potential matches to provide to the user. For example, an environmental information service might receive bar codes, product identifier, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of elements or information as discussed and suggested elsewhere herein. In such an instance, the information aggregator service 316 can utilize the aggregated data from the environmental information service 310 to attempt to locate products, in a product data store 322 or other such location, which are offered through the marketplace and that match, or are otherwise related to, the located digital entities. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well, such as phone number or yellow page information from a phone information data store 324 or point of interest information from a location data store 326. Various other types of information can be returned as well within the scope of the various embodiments.

The environmental information service 310 then can bundle at least a portion of the information and/or digital entities together to send to the client as part of one or more messages or responses to the original request. In some embodiments, the information from the identification services might arrive at different times, as different types of information might take longer to analyze, etc. In these cases, the environmental information service might send multiple messages to the client device as the information becomes available. The digital entities located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

As mentioned, an architecture such as that described with respect to FIG. 3 can be advantageous over conventional identification services at least for the fact that a user can send various types of data captured or otherwise obtained by a device as a collection of scene data, and can ask for information relating to any object, person, occurrence, or other item or element able to be identified from that scene. The "scene" data can include any appropriate type of data obtained by any sensor or other element of one or more electronic devices. For example, the user might stream information including an amount of video (e.g., five seconds, an amount manually selected by the user, or any other appropriate amount) captured by a video camera, along with a corresponding amount of audio data captured by a microphone of the computing device and/or other information captured by one or more sensors of the same or different types. In some embodiments, audio and video data might be captured by different devices that are able to communicate with each other, or another such arrangement. The information can include other sensor data as well, such as location data from a global positioning system (GPS) element, motion data from an accelerometer or inertial sensor, user identification information from a biometric sensor, and other such information. In at least some embodiments, this additional sensor data can be used to assist with one or more matching algorithms, used to suggest related elements, or other such aspects. In at least some embodiments, the application causing the scene data to be streamed or uploaded can request information pertaining to anything that can be identified from the scene data, including people, products, songs, locations, etc. In this example, the identification services are responsible for identifying the elements in a scene, and the environmental information service is responsible for generating the digital entities or sets of information to be provided to the client device for at least a portion of the identified elements.

It should be understood that, although the identification services are shown to be part of the provider environment 306 in FIG. 3, that one or more these identification services might be operated by third parties that offer these services to the provider. For example, an electronic retailer might offer an application that can be installed on a computing device for identifying music or movies for purchase. When a user transfers an audio clip, for example, the provider could forward this information to a third party who has software that specializes in identifying songs from audio clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the environmental information service to the client device 302.

In at least some embodiments, the environmental information service might return results that the user did not intend to capture. For example, a pack of gum might be on a person's desk and might be identified to the user as having been recognized from the provided image data. In at least some embodiments, a user can have the option of deleting results or otherwise indicating that the user is not interested in that type of data. In other embodiments, an application or service might monitor the type of results that the user is interested in, and use this behavioral data to suggest types of information to be displayed to a user. For example, if a user never uses the service to identify people but only products, then over time the service might learn to weight product results more heavily, specify not to return person identity results, etc. A service might also leverage data for the catalog or provider being used to provide the digital entities. For example, if a user has indicated to an electronic marketplace that the user does not like country music, the service might use this information to avoid sending digital entities relating to country music, in order to conserve bandwidth, storage, and other such aspects. At some point, the environmental information service can hear back from all the contacted identification services and/or information aggregators, and can send an "end identify" or similar call to the client device such that the client knows all identifying information has been provided.

In at least some embodiments, the identification services can provide confidence thresholds for each digital entity. These thresholds can be based on a quality of the match, as known in the art for pattern or feature matching, for example, as well as any other appropriate factors, such as indicated interests of the user, past behavior, purchasing history, and the like. Further, the performance of each identification service might be used to adjust a threshold, rating, weighting, or other aspect of recommendations or matches from each identification service. For example, an image identification service might produce matches that are selected by the user 60% of the time, while an audio identification service might product matches that are selected by the user 85% of the time. Accordingly, matches suggested by the image identification service might be weighted less than matches suggested by the audio identification service in order to adjust or normalize the performance of the identification services. In at least some embodiments, an environmental information service might only select matches of at least a minimum confidence level, or a maximum number of matches selected based on a ranking of confidence levels, to provide to a client device. In other embodiments, the environmental information service might set different selection thresholds for each identification service based on performance or other such factors.

After selecting one or more matches, the environmental information service can send digital entities for elements that match the scene information provided by the client device. In at least some embodiments, the client device might subsequently send another request for related digital entities for one or more elements. The digital entities for which to locate related elements can be based on any of a number of different factors, such as content a user is currently viewing, indicted interests of the user, and capacity on the device, among other such factors. In some embodiments where identification services and/or information aggregators have significantly different response times, the search for related elements might be more predictive, based on what the user might want to see in the near future, in order to start the search process earlier and reduce user wait times. Taking such an approach, the digital entities for the related elements can be sent as they are located until all identification services have provided a response. In other embodiments, the environmental information service might wait until a response has been obtained from all contacted identification services, or a maximum wait time has been reached, to send the digital entities together to the client device. Determinations as to how many messages to send and when to send the messages can be based upon any of a number of factors, such as bandwidth restrictions, storage capacity, current loads or traffic volumes, etc.

Similar considerations can be utilized on the client device when determining an amount of scene information to transmit to an environmental information service. For example, a user might set a limit on the amount of audio or video data that can be transferred in order to attempt to limit bandwidth overage charges. In some embodiments, a user might indicate that the device can only stream audio from one microphone, even though multiple microphones might be capturing audio data concurrently. Similarly, the user might indicate that image or video information only be streamed from one camera, even though multiple cameras might concurrently capture information. In at least some embodiments, the device can attempt to determine an "optimal" capture element for which to stream information. For example, the device might be able to determine a user who is speaking through volume or clarity of the audio, image recognition of a person's mouth moving or a user's gaze direction, or other by using other such approaches. Based at least in part upon these determinations, the device can select a camera or microphone facing that direction, closest to that person, etc., in order to attempt to provide scene information that will most likely produce accurate matches. In some embodiments, a user can manually select which audio or video capture element to use to provide information, can select whether to include position and related information, etc.

Based at least in part upon the amount and type of scene data provided, the resulting matches from the environmental information service can also include position information indicating a relative position of the match. For example, if a user is attempting to determine the identity of several people sitting around the room, the device can provide some indication of which person around the room corresponds to each identity. This can be provided graphically by including arranged icons or arrows, for example, or can be based upon orientation information from the client device whereby a user orienting the device towards a certain person can obtain the identity of the person in that direction. Various other options are possible as well, and further information for determining locations of identified objects and persons and displaying related information can be found in co-pending U.S. patent application Ser. No. 13/076,322, filed Mar. 30, 2011, and entitled "View Tracking Image Display," which is hereby incorporated herein by reference.

Figure 4:
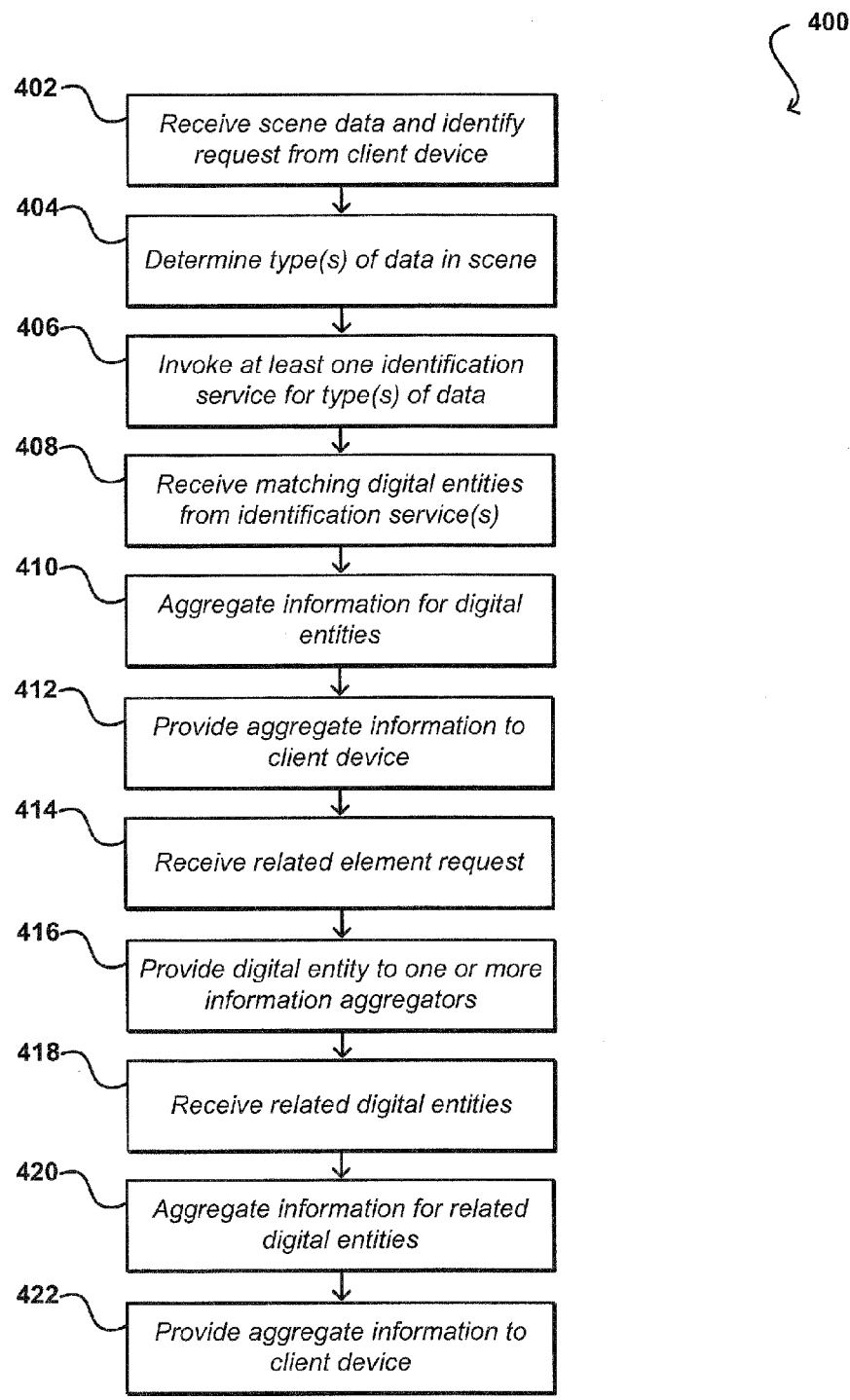
FIG. 4 illustrates an example process for identifying one or more elements in a scene that can be used in accordance with various embodiments.

FIG. 4 illustrates an example process 400 for locating matches for elements in scene data in accordance with various embodiments. It should be understood that there can be additional, fewer, or alternative steps performed in similar or alternative orders, or in parallel, within the scope of the various embodiments unless otherwise stated. In this example, a request to identify one or more elements in a set of collected or captured scene data is received 402. As mentioned, this can include one or more types of data captured by one or more types of sensor of one or more electronic devices, as may include audio, video, and contextual information for a current environment of a device. It should be understood, however, that the identify request could also include or specify data including a single type of data captured by a single element, such as an image of an object of interest captured with a single camera. The ability exists, however, to support multiple types of data concurrently. Further, the request can be generated manually by a user or automatically by the device, which might stream captured data for analysis in at least some embodiments.

The request can be received to an entity such as an environmental information service, which in at least some embodiments can attempt to determine 404 one or more types of data in the scene data before invoking 406 at least one identification service for the identified type(s) of data. In some embodiments, the environmental information service might instead send the scene data to a primary identification service or component, which is able to process various types of data in the scene. In response, the environmental information service can receive 408 one or more matching digital entities (e.g., product identifiers, pointers, or navigation links) from the identification services. The digital entity information can be aggregated 410, along with any with any referenced information such as product description or pricing information from one or more information aggregator services or other such entities, and the aggregate information can be provided 412 to the client device in response to the request.

Subsequently, a request for related elements can be received 414, which can include or specify at least one digital entity to be used to find related entities. This request can be triggered manually by a user of the client device or automatically by an application executing on the client device, or by another such mechanism. The request can be provided 416 to one or more information aggregator services configured to attempt to locate elements related to the digital entity, and one or more related entities can be received 418 back from the information aggregator services. Information for the related digital entities can be aggregated as well 420, and the aggregate information for the related entities provided 422 to the client device. As discussed, the information can be batched together and sent as a single message, or sent as part of several smaller messages as the information becomes available.

An advantage to utilizing the services and components offered in the provider environment is that there can be a significant amount of processing and data storage capacity in such an elastic, scalable environment (i.e., in the "cloud"), and such environments can also store much larger data sets than conventional client devices. A potential downside to such an approach, however, is that there often may not be continual connectivity to such an environment, such as when the user takes the client device to a location without cellular or WiFi access, or another such network connection. Without such a signal, the client device might not be able to leverage the various backend services used for matching. Similarly, the connection in some cases might be relatively slow, such as where the user has a standard cellular data connection, such that there might be relatively long delays in transmitting match information.

Systems and methods in accordance with various embodiments can address at least some connection- and/or speed-related issues by providing for both online (connected) and offline (disconnected) matching of scene information. In at least some embodiments, a portion of the matching information can be provided to, and stored on, the client device in order to attempt to perform matching on the client device for a number of elements even when no connection, or only a slow or intermittent connection, is available. Even when a full connection is available, however, the ability to perform at least some matching on the device itself can result in at least some faster results, which can help to improve the user experience. Further, doing as much matching as possible on the client device limits the amount of data that must be transferred between the client device and an environmental information service or other such entity. Limiting the amount of data transfer can result in lower bandwidth usage, as well as lower power consumption when the communications elements do not have to be activated or engaged to transmit and receive the respective data packets. Further still, a matching process on a client device typically will execute against a much smaller data set stored on the client device than hosted in the cloud, such that the matching process can be very fast when executed on the device.

In at least some embodiments, an identification service can support multiple different situations. For example, the service can operate as discussed above when there is full network connectivity between the client device and the backend systems of the provider environment. The service can also support a situation where there is no connectivity, but information has previously been provided to the client device enabling the client device to perform at least some amount of matching and identification. The service can also support a situation where there is at least some level of network connectivity, whereby the client device can leverage at least some of the backend systems, but the client device is also able to perform at least a portion of the matching and identification. Various other situations can exist as well within the scope of the various embodiments.

In order to enable matching and/or identification on the client device, approaches in accordance with various embodiments can determine one or more corpora of data to be provided to a client device. Each corpus can provide enough information enabling a respective identification algorithm to be run locally on a client device. In at least some embodiments, each identification service (or at least a set of identification services) can provide a corpus for a particular type of matching, such as for audio or video data, image data, etc. Similarly, the corpora might be for types of data within a type of matching, such as for object recognition or facial identification from image data, song identification or voice recogiition from audio data, and the like. Further, there can be different corpora for similar types of data and matching, but that provide different potential match information. For example, a corpus might be provided for song matching that includes information for artists in which a user has expressed an interest or made previous purchases, and a separate corpus might include information for artists that are currently popular and more likely to be heard by the user. Still another corpus might be provided with song information based on a current location of the user, such as when the user is in a jazz club or at a concert venue. Various other types of corpora can be provided at various times as well, as discussed and suggested elsewhere herein.

Much of the processing of information to be included in a corpus can be performed remote from a client device, such as by an identification service in the cloud or across a network. An identification service algorithm can execute against a very large data set, which can be continually updating, to produce a large set of results that can more easily be utilized for matching. Using an example discussed above, an algorithm might process an image to find a set of points of unique features in the image, and then store the set of points instead of the whole image, which can conserve storage space and facilitate faster matching, among other such advantages. When assembling the corpora, an identification service can include the sets of matching data to facilitate matching, such that the processing of the actual image, audio, video, or other such data does not have to be repeated on the client device. Because a client device generally will not have close to the amount of processing capacity as a service in the cloud, however, the information in the corpora can be selected intelligently to limit the size of the corpora and include those results that are most likely relevant to the user based on any of a number of factors, such as user interest, location, behavior, etc. In at least some embodiments, the corpora can also be deleted or otherwise expire at certain times in order to conserve resources on the client device. For example, if a corpus is pushed to a client device based on a current location of the user, the corpus might be deleted when the user leaves that location. A determination also can be made as to whether the client device has an appropriate algorithm for processing an algorithm to be pushed to the client device. If the client does not have the algorithm, but has appropriate permissions, capacity, specifications, etc., then the algorithm can be pushed to (or requested by) the device as well.

In one embodiment, information to be stored on the client device can be based at least in part upon matches located for scene information provided by that client device and/or a user associated with that client device. For example, a user might use the client device to provide a picture of a game for identification. When a identification service determines a match, information for matching an image of that game can be provided to the environmental information service, such that the matching information can be provided to the client device in addition to the digital entity associated with that matching information. If the user again captures image information including that game, a match can be determined locally on the client device since the matching information for the game is stored locally on the device. Such an approach can be faster and provide a much better user experience in at least some embodiments. As discussed, a client device can always attempt local matching first in some embodiments in an attempt to provide faster results and/or conserve resources, while in at least some cases additional and/or full sets of results can be provided from the backend services when received. In other embodiments, a device might attempt local matching when there is no appropriate network connection, when the device is in a low battery state, or when another such factor exists that makes it at least somewhat undesirable to utilize a remote information service for all or part of the matching.

Figure 5:
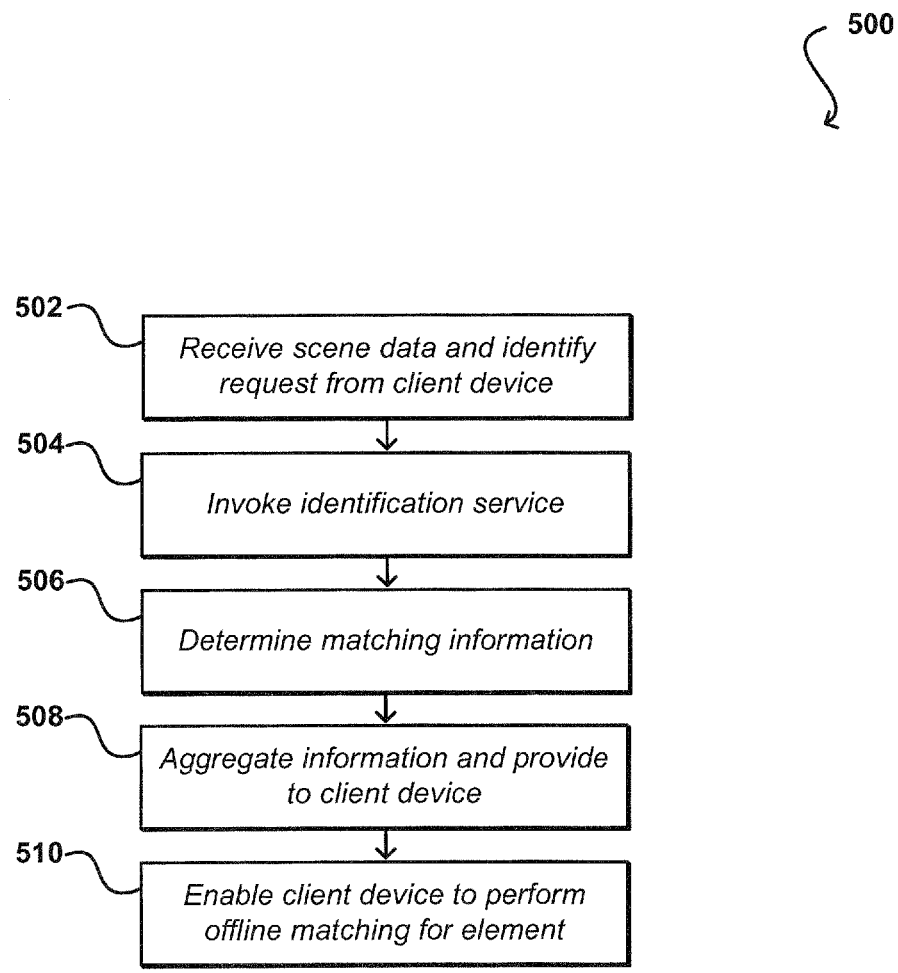
FIG. 5 illustrates an example process for identifying an element using an online and an offline approach in accordance with various embodiments.

FIG. 5 illustrates an example process 500 for enabling a client device to identify an element in accordance with various embodiments. In this example, a service such as an environmental information service receives 502 scene data and an identify request from a client device, where the scene data including information for an element of interest. The service can invoke 504 an appropriate identification service, as discussed above, to obtain at least one digital entity matching that element with at least a minimum level of confidence. In addition, the service can determine 506 matching information for a located digital entity. As discussed, the matching information can include feature points of an image, an audio fingerprint of a song, a spectrogram of a data file, or any other information that results from processing data to improve the efficiency of a matching process. The digital entity, matching information, and any related information can be aggregated 508 and provided to the client device, which can enable 510 the client device to perform offline matching for that element in response to a subsequent identify command from a user (or other such action or even) without having to re-contact the environmental information service. As discussed, part of the enabling process can also be to ensure that the client device has an appropriate algorithm or software process for utilizing the matching information for a particular type of data.

As an example, a book might not be in a corpus that has been provided to the device the first time the book is viewed on a table. The book can be identified by going through the backend services. In addition to the title, confidence, location, and other information, enough information can be included to populate the corpus on the device so that next time that book is encountered, the book can be identified by the corpus on the device, and information can be obtained much more quickly.

In addition to information that a user or client device obtains as a result of element matching, various corpora can be generated and provided to a client device that include information selected based on a number of different criteria. An entity such as a content provider or information service provider might cause corpora to be generated in batches to be pushed out to various users. For example, corpora might be pushed out daily, weekly, or at other appropriate times that include information matching currently popular items, such as that week's hit songs, current movies, popular items for the previous day, or other such information. There might be corpora generated, such as for the day's top 100 songs, that are sent to client devices for a variety of users, such as any users who have previously indicated an interest in music. In some cases, separate corpora might be generated that are sent to specific groups of those users, such as corpora for blues music preferences or rock music preferences, which might be sent to only a sub-group of the users receiving the popular music corpora. In some cases, the popular music corpora might be pushed out or updated at frequent intervals, whereby corpora for classic rock songs or other such items might be pushed out less frequently.

As mentioned, corpora also can be generated "on demand" based upon current user information, such as the current location or activity of a user. For example, a user might walk into an electronics store, as may be determined based on GPS coordinates, captured image or audio information, wireless connection information, or any other such information. If this information is provided to an environmental information service, such as by being pushed by the client device or through a polling process, the environmental information service can attempt to locate one or more corpora that pertain to an electronics store. For example, an information aggregator might suggest items from an electronic retailer catalog for a number of different categories of items, such as electronics, books, women's clothing, and the like. When the user is detected to be at a location corresponding to one of these categories, the environmental information service can select one or more appropriate corpora and cause those corpora to be transferred to the client device. Such an approach can be beneficial to the user as any element that the user captures while in the store can potentially have matching information stored on the device, which can allow for faster matches and determinations for elements of the type in that store, particularly where there might not be a strong connection available in the store. When the user leaves that store, the corpus can be flagged for deletion. In at least some embodiments, a FIFO buffer type approach is taken where expired information is stored on the device until space is needed for new information. In that way, the client device will not have to download electronic matching information again if the user goes back into that store or another electronics store. Further, if the user is interested in electronics, then having electronics matching information on the device can potentially provide for faster matching of elements of interest to the user even when the user is not at an electronics-related location.

In at least some embodiments, the corpora (or elements in the corpora) can have their lives extended on a client device by identifying an element in a corpus at a subsequent time. For example, consider the electronics store example where a corpus including electronics matching information is sent to the client device. After leaving the store, the corpus might be marked for deletion after a period of time. If, at a point during that period, the user captures an image of an electronics device for analysis, then the corpus including that device might be marked for deletion a period of time after the subsequent analysis. In some cases, the information for the actual object of interest might instead be marked for later deletion, where different elements of a corpus might be stored for different lengths of time. Various other storage and expiration approaches can be used as well within the scope of the various embodiments.

Various other information can be used to push information to a device as well. For example, a user might browse books on an electronic marketplace. If an environmental information service is able to determine such information, such as by being associated with a provider of the marketplace or having access to a user's browse history, the service can push a corpus relating to books to the client device. In some embodiments, the corpus might include information for current best sellers, new releases, or other selections that are likely to be viewed by a general user at the current time. In other embodiments, the corpus might include information for books of the genre that the user was browsing, books by authors the user expressed interest in, or other such collections of information. In some embodiments the best sellers corpus might be updated every week, while the genre corpus might be updated less frequently. In some embodiments, a corpus might be pushed to a user including books for home repair when a user goes into a home repair warehouse, even though the location itself might not be associated with books. Any appropriate criteria can be used to attempt to predict potential elements that the user might attempt to identify in the near future, in order to improve the user experience.

The corpora selected to push to the device can be based on other environmental or contextual information as well. For example, if a user is determined to be with a spouse or child, as may be based upon image or voice recognition, detection of another person's device, or other such information, the device might push different types of information than if the user was alone. For example, a woman at the mall might have different corpora pushed to her if she is alone than if she is with her children, such as where a corpus for toy matches might be pushed when she is with her children but not necessarily at other times. If the device detects music playing near the device while the user is in an electronics store, a service might cause corpora for popular music to be pushed to the device, even if the store itself does not sell music. While in some embodiments different corpora can be pushed down for each type of information, in some embodiments a "personalized" corpus might be generated for a user based on current contextual information. For example, if a user is at a store where a certain type of music is playing, a corpus might be sent with product information relating to items sold in the store and song information relating to the type of music being played at the store. For combined corpora, the corpus can include information including which type of algorithm to use to process each type of matching data.

Further, personalized corpora can be generated each day (or at other such intervals) and pushed to various user devices. In some embodiments, an environmental information service can look at information such as events on a user's calendar for a day, recent purchasing history, shopping trends, search queries, and other such information to attempt to determine elements of potential interest to the user. Based at least in part upon this information, a corpus can be generated and sent to the corresponding user device(s). In at least some embodiments such information can be pushed at off-peak times, such as during the middle of the night, in order to prevent a slowing of communications or processing, etc. In some embodiments, these relatively large corpora can be pushed at off-peak times, and smaller corpora more relevant to a current context or environment can be pushed throughout the day, as appropriate.

In some embodiments, retailers or other entities might provide information about the types of products that are offered at a particular location, which then can be used to generate the corpora. In other situations, a service might have to build up a list of the types of products or elements present at a particular location based upon information provided or analyzed by one or more users at that location. For example, there might not be any information about a small store that opens up in a strip mall. As users provide scene information from that location, however, the elements matching the scene information can be added to a list or selection of elements associated with that location, such that over time the service can make at least some intelligent predictions as to the types of elements the user might come across at that location. Even if the service might not know information about the current inventory of that location, the service can determine the types of items carried by, or presented at, that location and push the most current or most likely results for those types of item to the client device.

As mentioned, various algorithms can be associated with various types of data and matching, such that the service can also ensure the device has the appropriate algorithm(s) to process the type(s) of information that might likely be encountered at that location. Algorithms pushed out might also be based on characteristics of the device itself, such as the types of sensors on the device. For example, a different algorithm might be needed to process 3D video than 2D video. Similarly, a different algorithm might be advantageous for processing high resolution images as opposed to low resolution images. In some embodiments, a device might maintain a default set of algorithms selected based on the components or attributes of the device. Since at least some embodiments attempt to limit the amount of storage space needed on a device, algorithms and matching data might not be pushed to devices that are unable to support certain types of data.

Figure 6:
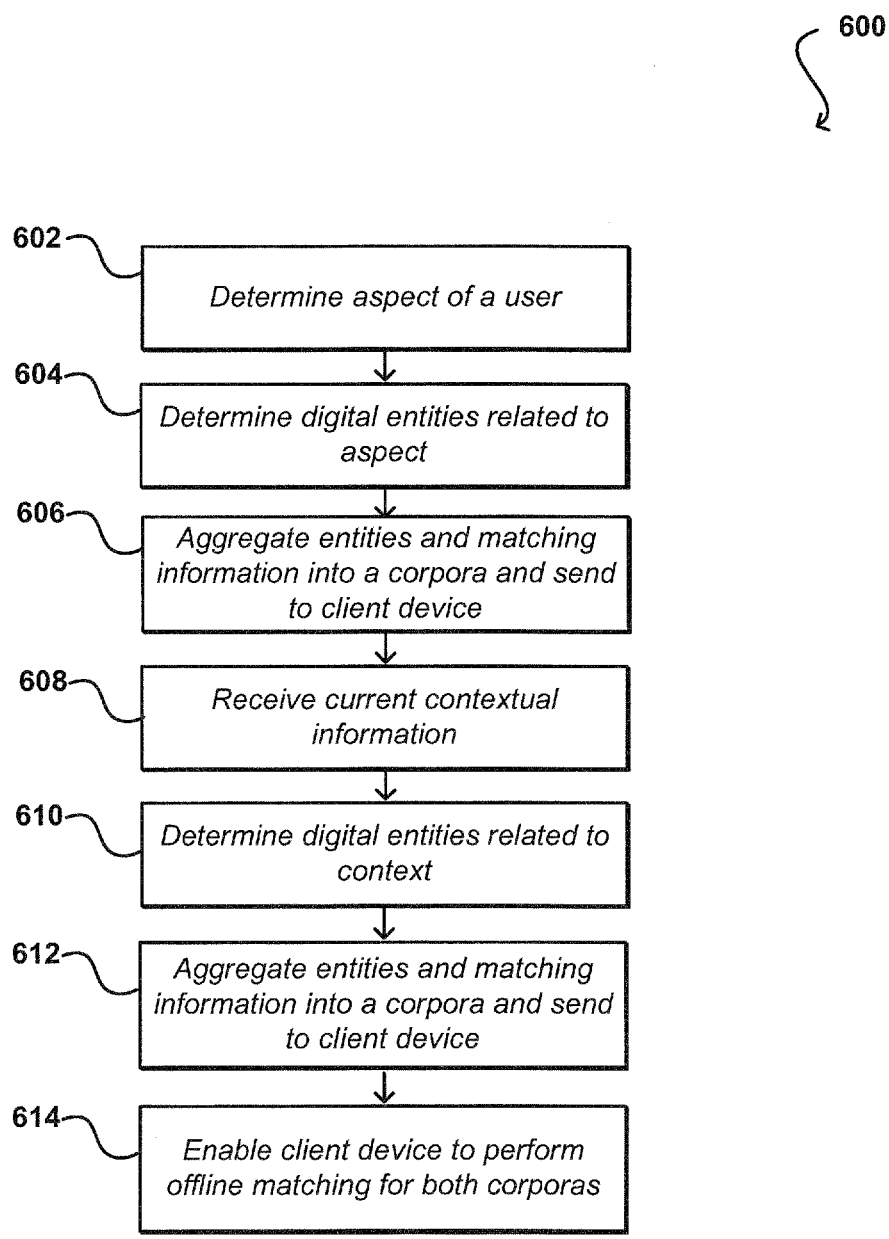
FIG. 6 illustrates an example process for providing a client device with one or more corpora that can be used for element identification in accordance with various embodiments.

FIG. 6 illustrates an example process 600 for providing corpora of data to a client device to assist with device-based or "offline" matching. In this example, at least one aspect of a user is determined 602. This can include, for example, determining where the user lives, what language the user speaks, what types of music the user likes, which types of Web site does the user visit, and/or any other such information. Based at least in part upon the determined aspect(s), one or more digital entities can be determined 604 that are related to the determined aspect(s). These entities can include, for example, songs of the genre the user likes, types of items the user buys, or other such information. For at least some of these digital entities, additional description and matching information can be aggregated 606 and provided to the client device. Corpora based on user aspects can be generated and provided at any appropriate time, such as once a day or once a week, sent in the middle of the night, etc.

In addition, the client device can determine various contextual information, such as a current location of the user or song playing in the background, and this contextual information can be received 608 to an environmental information service or other such entity. One or more digital entities can be determined 610 that are related to that contextual information. For example, songs of a genre similar to that playing near the device or products related to a current location of the client device can be selected as potential digital entities that the user might encounter based on the contextual information. Additional description, matching information, and any other appropriate information can be aggregated 612 for the digital entities and sent to the client device, which then can enable 614 the client device to perform "offline" matching for any element having a digital entity in those corpora. As mentioned, various different corpora can be provided at various times, such as upon regularly scheduled intervals or at times determined by contextual events, and the client device might still contact an environmental information service to attempt to find additional matches beyond those located in the local corpora.

In at least some embodiments, information for elements identified using an environmental information service or other such entity can be utilized by other providers as well for any of a variety of purposes. For example, an electronic retailer might recommend products that might be of interest to a user. These recommendations are often selected by looking at the types of elements the user has viewed and/or purchased through an electronic marketplace associated with the retailer. In at least some embodiments, the information for elements selected by the user for identification can be used to recommend elements or content through an electronic marketplace or content repository. For example, if a user identifies a book relating to a particular type of car, that information might be used to recommend products for that type of car to a user, where those products might include accessories for that type of car and not just books relating to that type of car. Similarly, if a user goes to an electronic content delivery site the user might see recommendations for articles on that type of car, or even cars in general. In at least some embodiments, the digital entities can act like keywords used by conventional recommendations engines to recommend content that will potentially be of interest to a particular user. In some cases a separate module on a site or page might include information for elements identified using an information service, for example, instead of incorporating that information into the main content of a page, etc.

Further, in some instances one or more other persons might be identified to be with a user when the user is attempting to identify an element. In some instances, the information for the identified person might be associated with that type of element for subsequent analysis. For example, a user might want to attempt to determine a gift for that identified person. The user in some embodiments can access a page that includes all the types of elements the user viewed while with that person. Such information can help to provide insight into the types of elements that might be of interest to that other person, such as where many of the elements viewed are of a certain type, or have a common aspect. For example, if a user commonly is interested in athletic shoes while with this other person, that might be indicative that the other person is also interested in athletic shoes, or at least athletic gear. In some embodiments, recommendations might be made based on the types of element viewed while with that person, or even the types of element that the other person was identified to be wearing, carrying, singing along to, or otherwise expressing some level of interest in.

In at least some embodiments, the information for an identified element might be decayed or weighted such that the element affects recommendations or corpus selections less over time. For example, if a user expresses interest in a type of element available for a current season, but does not express similar interest for a period of time, that element might affect recommendations less over time until the element is no longer associated with that user. In some embodiments, a user subsequently attempting to identify that type of element might cause the weighting or decay to be updated such that the type of element more heavily affects recommendations and selections. In some embodiments, a user might not even request to identify a type of element but the device can actively monitor things around the device and can potentially identify types of element s that the user is interested in, such as may be based on what the user is wearing or carrying, what elements are on nearby shelves, etc. Also, elements in which a user expresses interest in an electronic environment can affect the recommendations or corpora sent to a client device for the user, such as where the user buys a type of video game through an electronic marketplace. When a user subsequently visits an electronics store, a corpus for video games or a type of video game might be pushed to an associated client device.

In some embodiments, a section on a Web site can present elements that are similar to "recently matched" elements determined from scene data. The site can also remember the people with whom the user has been recently based on the scene data, and can generate wish lists for those persons, prompt the user to purchase a gift or thank you card for that person, etc. If the user provides birthday information for an identified person (or if that information is otherwise obtained, such as by pulling information from a social networking site), a site can remind the user of the birthday and offer gift suggestions.

In addition to people being associated with elements, elements can be associated with each other. For example, if a user frequently has a type of snack with a particular brand of beverage, as determined by captured scene information, then discounts might be offered when a user attempts to buy that brand of beverage to encourage the user to also buy that type of snack. In some cases, a service might be able to determine from captured content that the user is intending to watch a sporting event when having these elements together, such that the service might push down a corpus relating to sports-related images or audio clips, etc. Various other associations can be leveraged as well as should be apparent in light of the present disclosure.

Figure 7:
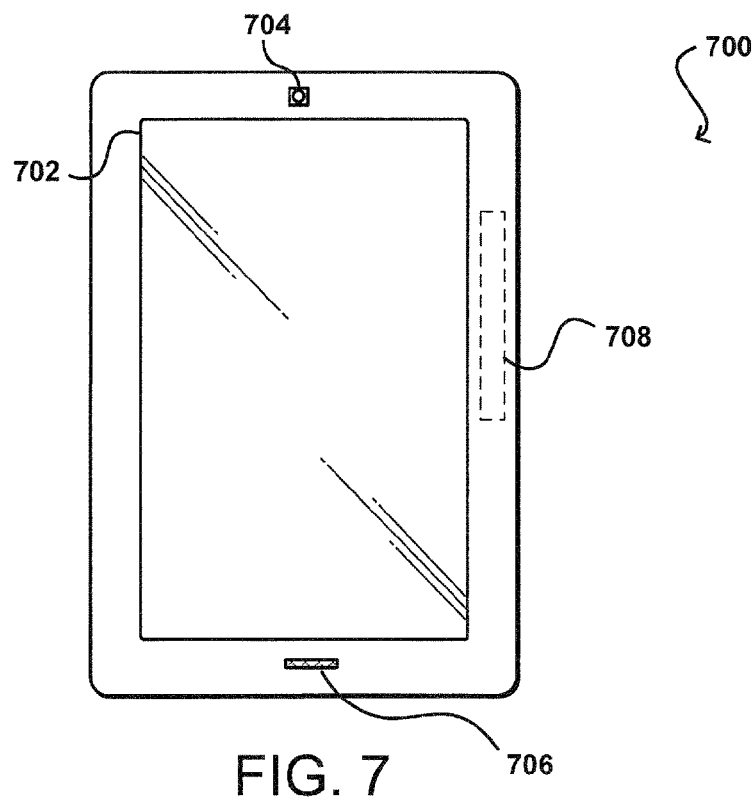
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
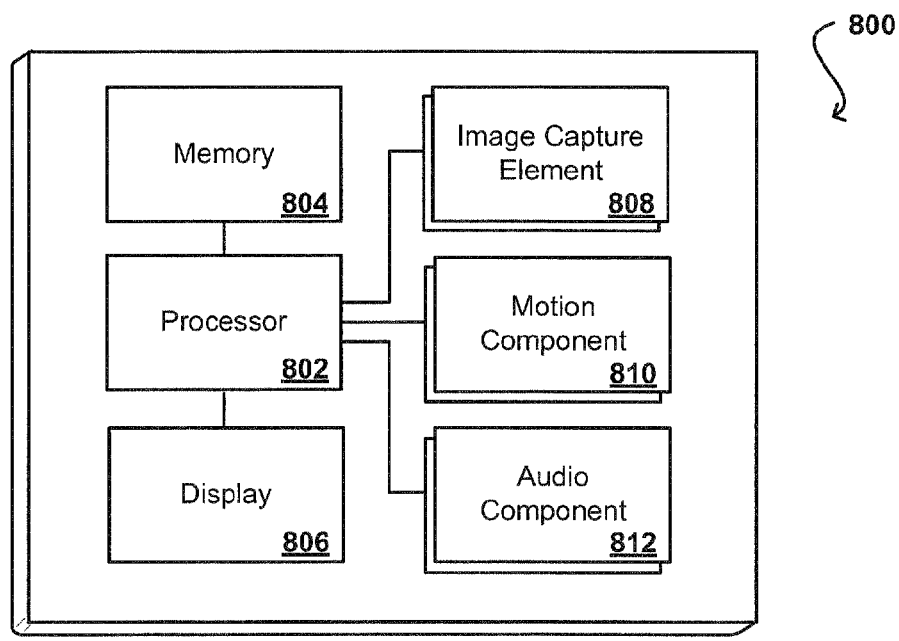
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
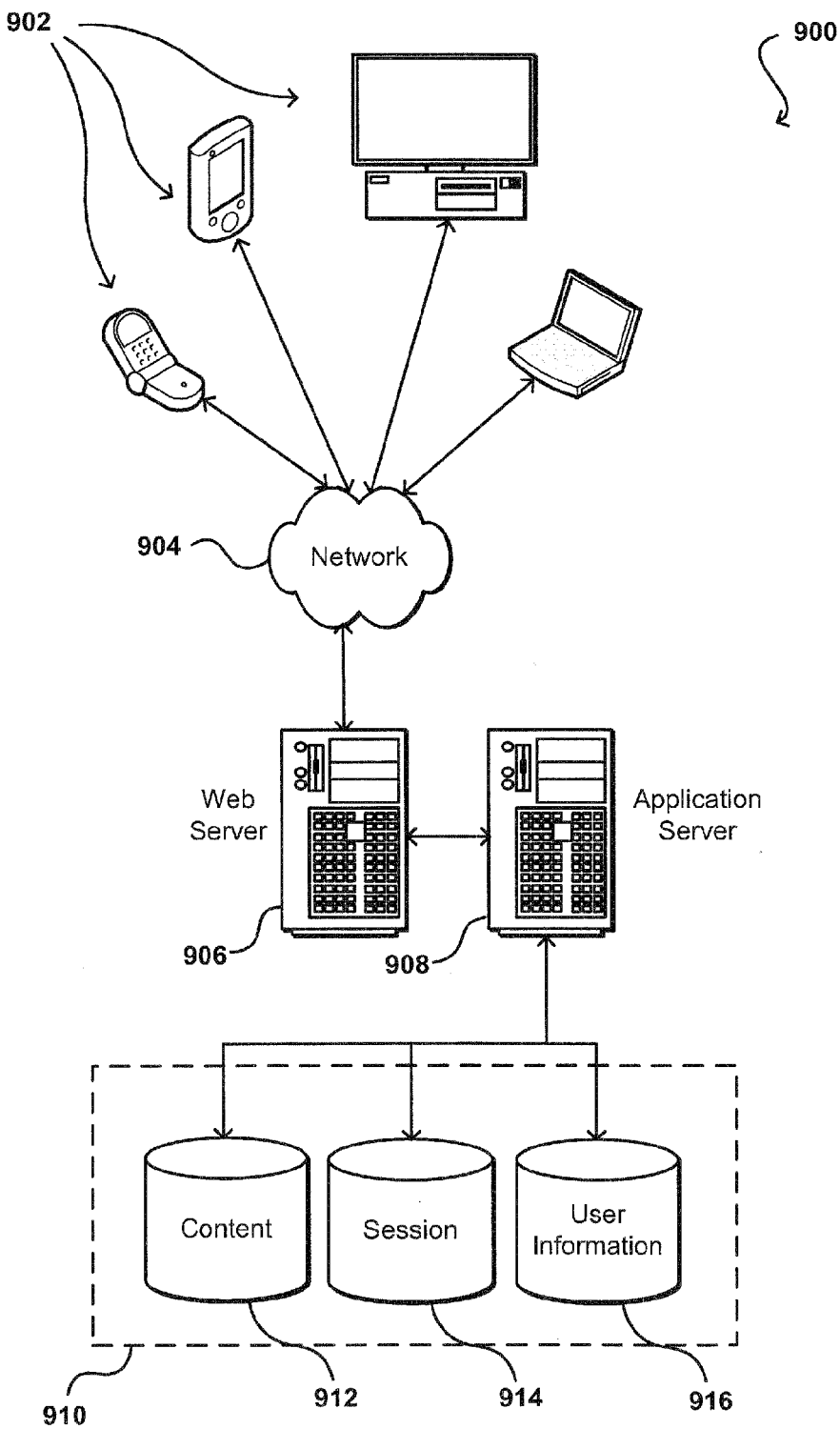
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybaseg®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for identifying elements, comprising:
    an information server configured to:
        receive an identify request including scene data obtained by a computing device, the scene data including first data captured using a first sensor and second data captured using a second sensor of the computing device, the first data and the second data being selected from at least one of image data, audio data, biometric data, or location data;
        receive contextual information corresponding to at least one of the first data or the second data;
    an identification server configured to:
        match, using the first data and the second data, an element in the scene data with at least one digital entity, the at least one digital entity being associated with information for the element; and
    a data aggregation server configured to:
        provide contextual data to the computing device, the contextual data including the information for the element matched by the identification server and the contextual information obtained by the information server, the contextual data allowing the computing device to perform offline matching during a subsequent identify request for the element in the scene data.

2. The system of claim 1, wherein the identify request is received over a network that communicatively couples the information server, the identification server, the data aggregation server, and the computing device.

3. The system of claim 1, wherein the data aggregation server is further configured to locate additional digital entities in response to a related elements request received from the computing device, the additional digital entities corresponding to at least one second element associated with the element.

4. The system of claim 1, wherein the identification server sends match data in batches based at least in part upon times of receipt of the information for the element.

5. The system of claim 4, wherein the identify request and the scene data are received in a first data stream from the computing device, and wherein the identification server sends the match data to the computing device in a second data stream.

6. The system of claim 1, wherein the contextual data includes similar information for the element matched by the information server and obtained by the information server.

7. The system of claim 1, wherein the contextual data includes extrapolated information for the element matched by the information server and obtained by the information server.

8. The system of claim 1, wherein the first sensor is distinct from the second sensor.

9. The system of claim 1, wherein the offline matching during a subsequent identify request includes previous scene data.

10. The system of claim 1, wherein the preference information is determined by previous scene data.

11. A computer-implemented method of identifying elements, comprising:
    receiving an identify request including first data captured using a first sensor and second data captured using a second sensor of a computing device, the first data and the second data being selected from at least one of image data, audio data, biometric data, or location data;
    receiving contextual information corresponding to at least one of the first data or the second data;
    matching an element in the first data with a digital entity, the digital entity being associated with information for the element;
    determining additional information associated with the digital entity;
    aggregating, using a processor of at least one computing system, the information and the additional information associated with the digital entity as match data;
    sending contextual data to the computing device, the contextual data including the information for the element, the additional information, and the contextual information, the contextual data allowing the computing device to perform offline matching during a subsequent identify request for the element in the first data; and
    providing the match data to the computing device.

12. The computer-implemented method of claim 11, wherein the match data includes at least one of product information, person information, place information, text information, song information, movie information, or object information.

13. The computer-implemented method of claim 11, wherein the digital entity is provided by information services, the information services locating matches for the element in the first data.

14. The computer-implemented method of claim 13, wherein the information services provide information identifying a location corresponding to the first data or the second data.

15. The computer-implemented method of claim 13, further comprising determining the digital entity using at least one matching algorithm, wherein the information services provide a confidence level for the digital entity determined using the at least one matching algorithm.

16. The computer-implemented method of claim 15, further comprising:
    adjusting the confidence level based at least in part upon a historical performance of the information service.

17. The computer-implemented method of claim 16, wherein the historical performance includes a percentage or frequency of times the one or more digital entities are modified.

18. The computer-implemented method of claim 11, wherein the digital entity includes at least one of product identifiers, pointers, addresses, or location links.

19. The computer-implemented method of claim 11, wherein the digital entity is associated with products of an electronic catalog, and wherein the additional information includes at least one of product description information, product availability information, and pricing information.

20. The computer-implemented method of claim 11, further comprising:
  receiving a related request from the computing device;
  locating at least one related digital entity and additional information corresponding to the at least one related digital entity;
  aggregating the at least one related digital entity and the additional information as related match data; and
  providing the related match data to the computing device in response to the related request.

21. The computer-implemented method of claim 11, wherein providing the contextual data to the computing device includes adjusting the contextual data based at least in part upon at least one aspect of the computing device or at least one aspect of a user of the computing device.

22. The computer-implemented method of claim 21, wherein the at least one aspect of the computing device includes at least one of a storage capacity, a processing capacity, or a type of component available on the computing device.

23. The computer-implemented method of claim 21, wherein the at least one aspect of the user of the computing device includes at least one of preference information, behavioral information, purchase history, or search information for the user.

24. A computing device, comprising:
  a processor, a first sensor communicatively coupled to the processor;
  a second sensor communicatively coupled to the processor; and
  a memory device including instructions that, when executed by the processor, cause the computing device to:
    receive an identify request including first data captured using the first sensor and second data captured using the second sensor, the first data and the second data being selected from at least one of image data, audio data, biometric data, or location data;
    receive contextual information corresponding to at least one of the first data or the second data;
    receive information associated with matching an element in the first data with one or more digital entities, the one or more digital entities having an associated match confidence level;
    determine additional information associated with the one or more digital entities;
    select a portion of the additional information based at least in part upon the associated match confidence level as match data; and receive contextual data that includes the information associated with matching the element, the additional information, and the contextual information, the contextual data enabling offline matching during a subsequent identify request for the element in the first data.

25. The computing device of claim 24, wherein the one or more digital entities are provided by information services, the information services locating matches for the element in the first data, and wherein the information services provide a confidence level for the one or more digital entities using at least one matching algorithm.

26. The computing device of claim 25, wherein the instructions when executed further cause the computing device to:
  adjust the confidence level based at least in part upon a historical performance of the information service, the historical performance including a frequency or percentage of times the one or more digital entities are modified.

27. The computing device of claim 25, wherein the instructions when executed further cause the computing device to:
  receive a related request from the computing device;
  locate at least one related digital entity and additional information corresponding to the at least one related digital entity;
  aggregate the at least one related digital entity and the additional information as related match data; and
  provide the related match data to the computing device in response to the related request.

28. A non-transitory computer-readable storage medium including instructions for identifying elements, the instructions when executed by a processor of a computing device causing the computing device to:
  receive an identify request including first data captured using a first sensor and second data captured using a second sensor of a computing device, the first data and the second data being selected from at least one of image data, audio data, biometric data, or location data;
  receive contextual information corresponding to at least one of the first data or the second data;
  receive information associated with matching an element in the first data with one or more digital entities, the one or more digital entities having an associated match confidence level;
  determine additional information associated with the one or more digital entities;
  select a portion of the additional information based at least in part upon the associated match confidence level as match data; and
  receive contextual data that includes the information associated with matching the element, the additional information, and the contextual information, the contextual data enabling offline matching during a subsequent identify request for the element in the first data.

29. The non-transitory computer-readable storage medium of claim 28, wherein the one or more digital entities are provided by information services, the information services locating matches for the element in the first data, and wherein the information services provide a confidence level for the one or more digital entities using at least one matching algorithm.

30. The non-transitory computer-readable storage medium of claim 29, wherein the instructions when executed further cause the computing device to:
  receive a related request from the computing device;
  locate at least one related digital entity and additional information corresponding to the at least one related digital entity;
  aggregate the at least one related digital entity and the additional information as related match data; and
  provide the related match data to the computing device in response to the related request.

31. The non-transitory computer-readable storage medium of claim 28, wherein the instructions when executed further cause the computing device to:
  adjust the confidence level based at least in part upon a historical performance of the information service, the historical performance including a frequency or percentage of times the one or more digital entities are modified.

* * * * *